Feb. 14, 1933. J. E. WILSON ET AL 1,897,352
DOUGH PROVING APPARATUS
Filed April 15, 1931  2 Sheets-Sheet 1
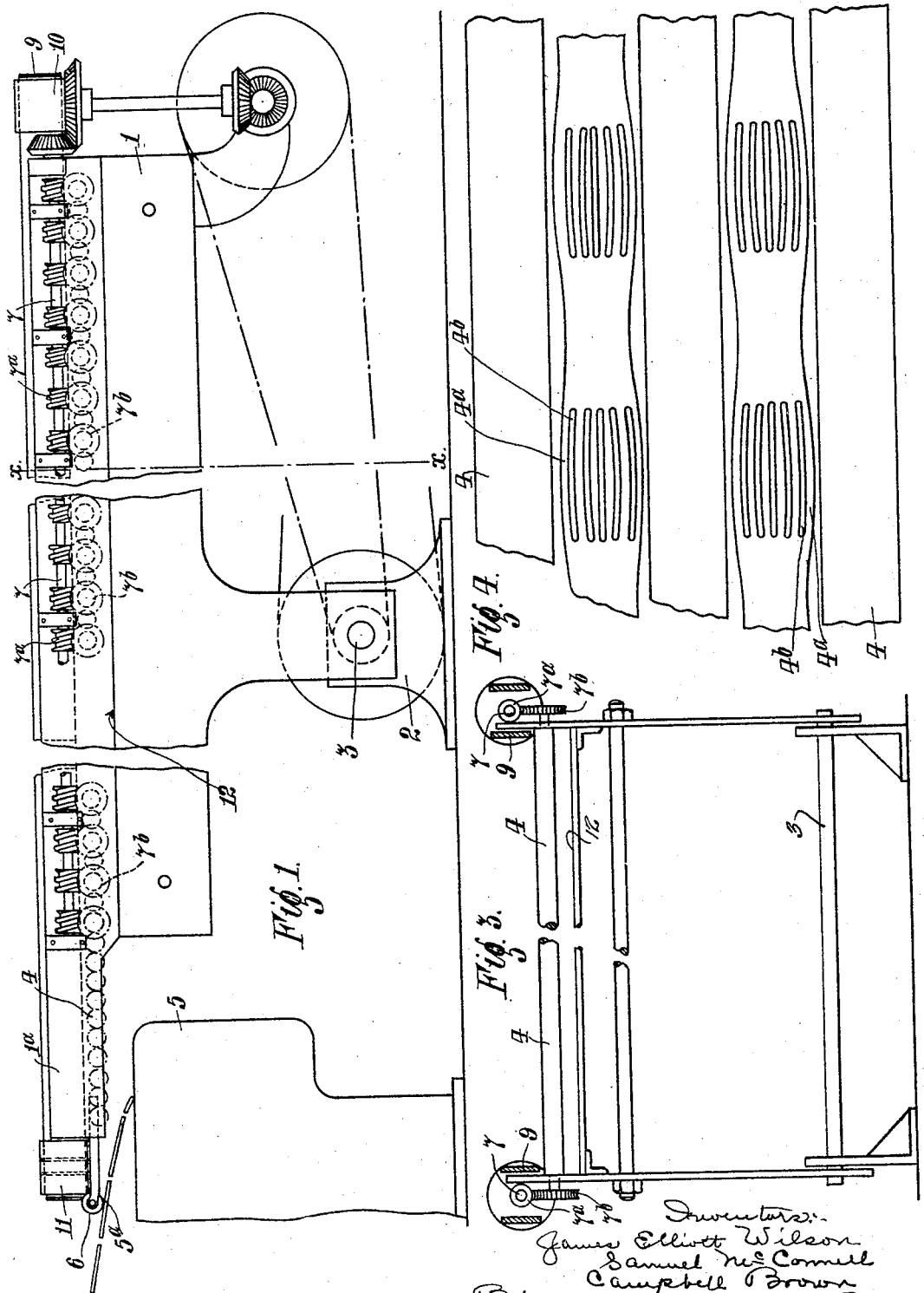

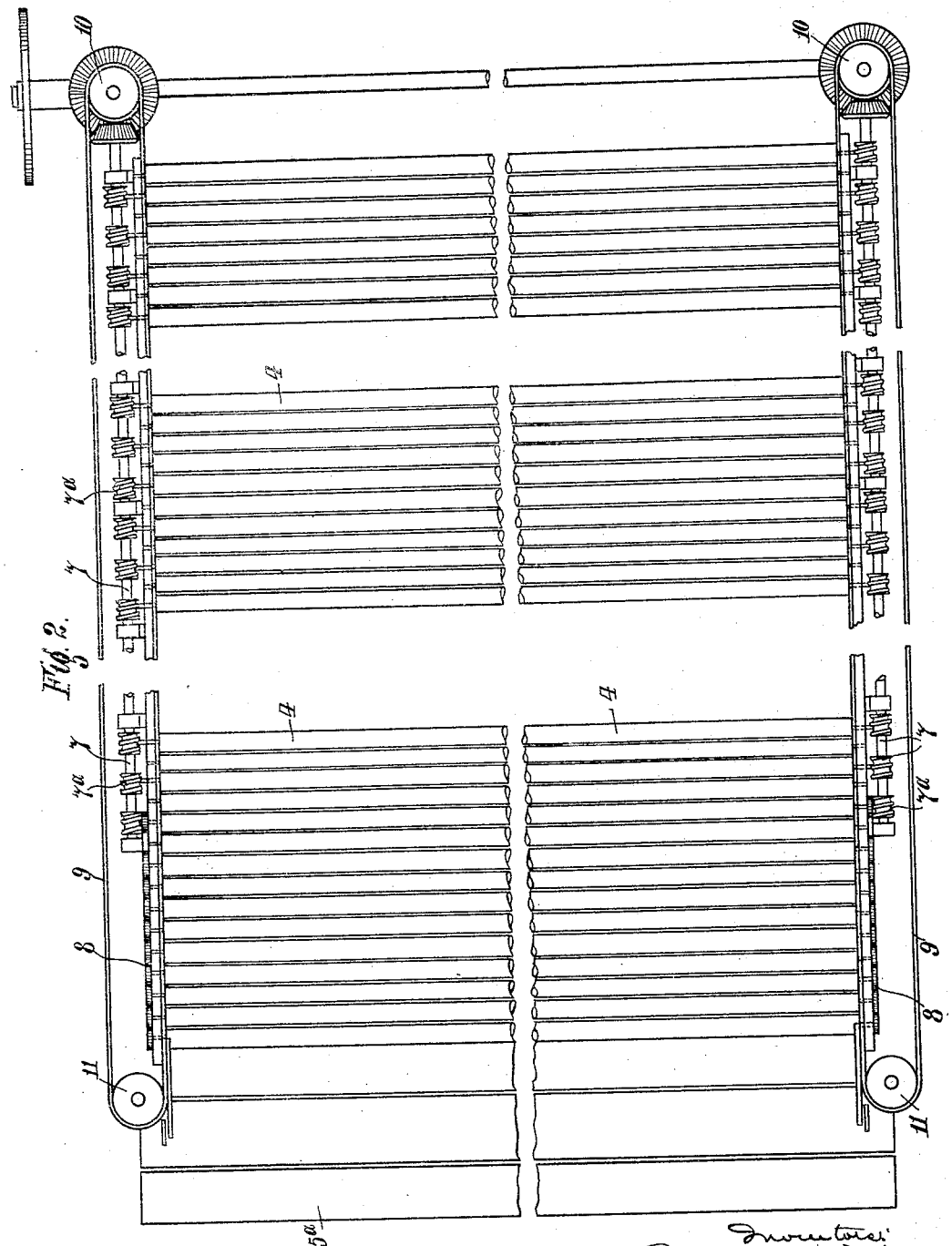

Patented Feb. 14, 1933

1,897,352

UNITED STATES PATENT OFFICE

JAMES ELLIOTT WILSON, SAMUEL McCONNELL AND CAMPBELL BROWN, OF BELFAST, IRELAND

DOUGH PROVING APPARATUS

Application filed April 15, 1931, Serial No. 530,212, and in Great Britain May 10, 1930.

This invention relates to dough proving apparatus used in the manufacture of bread and the like. The invention has for its object the more efficient handling of dough pieces after any usual moulding, or like operation and automatically placing them in position on bakers' ovens, hotplates or the like. In the known means for proving dough, after moulding, the pieces are placed by hand in trays which, when filled, are placed in enclosed frames mounted on wheels, where they remain until sufficient time has elapsed to obtain the necessary proving action on the dough. The trays with their supporting framework are then moved on the floor of the bakery to the oven and the dough pieces then placed in the oven by hand or by sliding the dough pieces off the tray. In another known way of obtaining the proving action on the dough pieces, endless chain carriers for the trays are provided which carry the trays from one end to the other end of a continuous conveyor prior to placing the dough pieces on the oven by hand or by sliding them off the trays. This type of prover is chiefly used in connection with travelling ovens.

According to this invention a dough proving machine, or apparatus, is provided, whereby dough pieces, either in tins, or trays, or without such carriers, are conveyed from end to end of a travelling conveyor, comprising a plurality of small diameter rollers in parallel formation, the rollers being placed as closely together as possible, or as desirable, and made to revolve in the same direction and, preferably, at the same speed. The drive of the rollers may be by any suitable drive, for example by means of gearing, the meshing gear wheels at each side being arranged alternately as fast and loose gear wheels, so that each roller has, on one end, a fast gear wheel and on its other end a free or idle gear wheel. This arrangement provides for the driving of all the rollers in the same direction and for the positive driving of each roller of the conveyor. Alternatively, a worm or a chain drive may be used. In order that the sides of the dough pieces on the outer rows may be supported and assisted in their travel on the machine, moving side bands, or equivalent, supported by boards, or equivalent, are preferably provided and suitably driven, means being provided for adjusting the tension on these bands if necessary.

For the delivering of the dough pieces to the roller proving apparatus, or machine, we may provide a board, or boards, which may be in the form of a trough of the same length as the width of the proving machine with means for discharging the dough pieces simultaneously from this trough on to the rollers of the proving machine or, alternatively, the dough pieces may be fed on to a suitable board, or equivalent, and an arm, or member, provided and adapted to shove the dough pieces from the board on to the proving machine, or again alternatively the dough pieces may be fed directly on to the proving machine by the operator and a board, or equivalent arranged on a guide, whereby the operator can be guided in placing the dough pieces in line with the row of dough pieces at a uniform distance from the previous row of pieces. The guide board would follow the dough pieces as they are being put on, until the whole of the row has been placed in position and it would have a quick return ready to assist the operator in placing the next row of pieces in position.

The length or size of the proving machine would be such as to provide the required time for proving the dough pieces and when the dough pieces reach the oven they are deposited on to the travelling plates automatically by the action of the rollers. The whole machine can be enclosed in order to maintain an even temperature.

Means can be provided for dusting the rollers with flour, or other suitable dusting medium, for example by providing an overhead flour duster, or causing a flour receptacle to be moved up into contact with the rollers from below.

The end of the roller proving machine may be supported on the oven by wheels and may be so supported that the whole battery of rollers can rock slightly longitudinally to bring the rollers into closest possible relationship to the moving plates of the oven.

The movement of the rollers may be intermittent, or continuous, or a combination thereof, and a constant or variable speed drive provided as required.

While we have described the delivery of the dough pieces to an oven, it is to be understood that the invention is also suitable for proving dough pieces for delivery to a baking hotplate, with travelling plates, or to any other baking operation subsequent to a proving operation.

The invention will now be described, by way of example only, with reference to the accompanying drawings, which show an example of proving apparatus in accordance with the invention, constructed and arranged for the delivery of dough pieces to a travelling oven.

Fig. 1 is an elevation of the dough proving machine, part being cut away in order to bring the drawings within reasonable dimensions.

Fig. 2 is a plan view corresponding to Fig. 1.

Fig. 3 is a sectional view on the line X—X Fig. 1.

Fig. 4 is an enlarged detail view of a modified form of roller, hereinafter described.

Referring to the drawings:—

The dough proving machine, as shown in the drawings, comprises a framework 1 supported on a pillar 2 and capable of slight oscillation about a driving shaft 3. On the framework 1 is mounted a series of small diameter rollers 4, in parallel formation, the rollers 4 being placed as closely together as possible. The discharge end of the machine framework at 1ª is preferably overhung or of cantilever construction as shown at Fig. 1, with the end 5 of the oven below said overhanging portion of the machine, so that the rollers 4 at the discharge end of the machine are brought as closely down on the moving oven plates 5ª as possible. Rollers 6 are shown provided on the extreme forward end of the overhanging portion 1ª of the frame, said rollers 6 resting on the plates 5ª of the oven. Any unevenness in the oven plates 5ª is allowed for by the fact that the whole of the proving machine can oscillate slightly about its pivotal support or shaft 3. Central or other supports may be provided for the rollers 4, if required.

The driving of the rollers 4 is effected, as regards the majority of the rollers through the medium of worms 7ª on a spindle 7 driving worm wheels 7ᵇ. Each alternate roller is driven from an opposite end of the machine and the plurality of small diameter rollers 4 are caused to revolve in the same direction, and, preferably, at the same speed. In the cantilever or overhung portion 1ª the worm and worm wheel drive for the rollers is replaced by meshing gear wheels 8, each alternate gear wheel at each side being an idle wheel, the gear wheels 8 being therefore alternately fast and loose and each roller having, at one end, a fast gear wheel and at its other end a loose gear wheel. This arrangement provides for the driving of all the rollers in the same direction and for the positive driving of each roller of the conveyor.

In order that the sides of the dough pieces on the outer rows, may be supported and assisted in their travel on the machine, we provide moving side bands 9, each driven by means of a driving pulley 10 and each passing round a pulley 11 at the front of the machine. Any usual or suitable means would be provided for adjusting the tension on the bands 9.

The dough pieces may be fed to, or delivered on to the proving machine by hand and for this purpose the operator may use a board, or equivalent, as a guide for placing the dough pieces in a line across the machine and at a uniform distance from any previous row of pieces. This guide board would follow the dough pieces as they are being put on until the whole of the row has been placed in position, when it will be taken back and again placed in position by the operator for a guide in connection with the placing in position of the next row of pieces. If desired, such a guide board could be automatically operated, but in practice it is found that it is quite easy and convenient for the operator to place the guide board in position and remove it to its new position as required. As another example of how the dough pieces may be placed upon the proving machine, they may be arranged upon a board or boards, forming a trough of the same length as the width of the proving machine with means for discharging the dough pieces simultaneously on to the rollers. Such an arrangement is well known in other bakery operations and need not be further described or illustrated. Another alternative arrangement would be to provide a board on which the dough pieces would be placed with an arm or member adapted to shove the dough pieces from this board on to the proving machine.

As shown at Fig. 1 a trough 12 may be provided below the rollers and kept filled with flour for the purpose of dusting the rollers with flour; the rollers being simply allowed to turn in the flour contained in the trough 12. This arrangement could be replaced by an overhead flour duster.

The dough lumps in being fed over the feeding rollers 4 have sometimes the tendency for the bottom of the lump to drag behind in passing from roller to roller, with the result that the loaf gets more or less out of shape. To obviate this draw-back, the rollers 4 may, as shown in Figure 4, be made with portions of slightly reduced diameter forming curved barrel shaped enlargements 4ª on which there is preferably provided correspondingly shaped recesses or flutes 4ᵇ. These rollers are preferably alternately arranged with plain rollers, or they may be introduced in the proportion of one to two plain rollers, or otherwise. Obviously the peripheral speed of the barrel shaped enlargements will be greater than the plain or reduced parts of the rollers, and thus the barrel shapes and flutes or recesses insure that the bottom of the dough pieces at these parts is pushed forward at a lightly greater rate of speed than the rest of the piece. The rollers are provided with these shaped enlargements corresponding in number to the dough pieces to be handled, and so that the shaped enlargements are located substantially in the center of each dough piece. Due to the barrel shaped rollers increasing the speed of the bottom of the lump of dough in the center, they have proved very efficient in practice in maintaining the shape of the loaf or dough.

The length or size of the proving machine would be such as to provide the required time for proving the dough pieces. The action of the rollers at the discharge end of the proving machine is to gently deposit the proved dough pieces on to the travelling oven plates 5ª. It will be understood that the whole machine can be enclosed in order to maintain an even temperature and also for the purpose of protecting the dough pieces from dust etc.

We claim:—

1. Dough proving apparatus comprising a series of rollers, means for rotating said rollers each in the same direction, a supporting structure wherein all said rollers are mounted so as to constitute a travelling conveyor for the dough to be proved, and a single axis about which the structure has rotative movement to permit variation in the slope of the rollers in the direction of feed of said dough.

2. Dough proving apparatus comprising a series of rollers, means for rotating said rollers each in the same direction, a structure for supporting said rollers in coplaner formation so as to constitute a travelling conveyor for dough to be proved, and a shaft whereon said structure is so supported as to permit rocking of said conveyor rollers bodily in the direction of feed of said dough.

3. Dough proving apparatus comprising a series of rollers, means for rotating said rollers each in the same direction, a structure for supporting said rollers in parallel formation so as to constitute a travelling conveyor for dough to be proved, and a driving shaft for rockably supporting said structure and adapted to drive said means for rotating said rollers.

4. Dough proving apparatus comprising a battery of rollers, fluted barrel shaped parts integrally formed at intervals along every alternate roller of said battery, means for rotating all said rollers in the same direction, a supporting frame wherein all said rollers are mounted so as to constitute a travelling conveyor for dough to be proved, and a single pivotal element whereon said frame is rockable in the direction of feed of said rollers.

5. Dough proving apparatus comprising a series of rollers, means for rotating said rollers each in the same direction, a supporting structure wherein all said rollers are mounted so as to constitute a travelling conveyor for dough to be proved, bearing means whereby said structure with said rollers is rockably supported, an overhanging integral bracket at the forward end of said structure, a short series of supplementary rollers on said bracket constituting a continuation of said travelling conveyor, and a rotary level adjusting means on said bracket for determining the inclination of said structure.

6. Dough proving apparatus comprising a series of rollers, means for rotating said rollers each in the same direction, a supporting frame wherein all said rollers are mounted so as to constitute a travelling conveyor for dough to be proved, a pivotal axis located midway along said series of rollers to enable the conveyor constituted thereby to be rocked in the direction of feed, an overhanging integral bracket at the forward end of said frame, and wheel means whereby said frame is adjustable in level to maintain constant relationship of said rollers with the surface whereon said dough, after proving on said rollers, is deposited.

7. Dough proving apparatus comprising a series of rollers, rotary driving means for rotating said rollers in the same direction, a structure for supporting said rollers and said rotary driving means, enlarged grooved portions formed at intervals on said rollers, to prevent dragging behind of parts of the dough pieces and thereby preserve the shape of said pieces in passing from roller to roller, bearing means whereby said structure is so supported as to be rockable as a whole in the direction of feed of said dough, guide bands at each side of said rollers, and means for driving said bands so that the parts thereof next the dough on said rollers moves in the same direction as the direction of feed of the rollers.

8. Dough proving apparatus comprising a series of rollers in contact with and over which the dough passes, rotary driving means for rotating said rollers all in the same direction, enlarged grooved portions formed at intervals on said rollers, so as to be located substantially at the center of each dough piece and thereby prevent dragging behind thereof, and traveling means adjacent the ends of the rollers and moving in the same direction as the feed of the rollers.

9. Dough proving apparatus comprising a series of rollers, means for rotating all of said rollers in the same direction, portions of certain of said rollers for a substantial extent being of greater diameter than the remainder of the rollers, said portions being spaced in directions lengthwise of the axes of the rollers, and integral peripheral dough gripping parts formed on said portions of larger diameter, said portions of the rollers being disposed substantially at the center portion of each dough piece and operating to prevent dragging behind of such pieces as the dough passes from roller to roller.

10. Dough proving apparatus comprising a series of rollers, means for rotating all of said rollers in the same direction, portions of certain of said rollers for a substantial extent being of greater diameter than the remainder of the rollers, said portions being spaced in directions lengthwise of the axes of the rollers, integral peripheral dough gripping parts formed on said portions of larger diameter, said portions of the rollers being disposed substantially at the center portion of each dough piece and operating to prevent dragging behind of such pieces as the dough passes from roller to roller, and a structure for supporting said rollers bodily to constitute a conveyor for the dough to be proved.

In testimony whereof we affix our signatures.

JAMES ELLIOTT WILSON.
SAMUEL McCONNELL.
CAMPBELL BROWN.